(12) United States Patent
Stefan et al.

(10) Patent No.: US 7,410,040 B2
(45) Date of Patent: Aug. 12, 2008

(54) CONICAL CLUTCH PACK ACTUATOR ESPECIALLY FOR A TRANSFER CASE

(75) Inventors: Dan M. Stefan, Windsor (CA); Thomas C. Bowen, Rochester Hills, MI (US); Jason R. Davis, Commerce Township, MI (US)

(73) Assignee: DYMOS Co., Ltd., Farmington Hills, MI (US)

( * ) Notice: Subject to any disclaimer, the term of this patent is extended or adjusted under 35 U.S.C. 154(b) by 403 days.

(21) Appl. No.: 11/315,836

(22) Filed: Dec. 21, 2005

(65) Prior Publication Data

US 2007/0137970 A1 Jun. 21, 2007

(51) Int. Cl.
*F16D 13/04* (2006.01)

(52) U.S. Cl. ............ 192/35; 192/93 R; 192/70.23

(58) Field of Classification Search ............ 192/93 R, 192/93 A, 70.23, 35; 74/99 A
See application file for complete search history.

(56) References Cited

U.S. PATENT DOCUMENTS

| | | | |
|---|---|---|---|
| 2,626,692 A * | 1/1953 | Sloan | 192/93 C |
| 2,883,008 A * | 4/1959 | Lucker | 188/71.3 |
| 5,092,825 A | 3/1992 | Goscenski, Jr. et al. | |
| 5,441,137 A | 8/1995 | Organek et al. | |
| 5,469,948 A | 11/1995 | Organek et al. | |
| 5,499,951 A | 3/1996 | Showalter | |
| 5,505,285 A | 4/1996 | Organek | |
| 5,528,950 A | 6/1996 | Organek et al. | |
| 5,651,437 A * | 7/1997 | Organek et al. | 192/35 |
| 5,810,141 A | 9/1998 | Organek et al. | |
| 5,819,883 A | 10/1998 | Organek et al. | |
| 5,910,061 A | 6/1999 | Organek et al. | |
| 5,964,330 A | 10/1999 | Organek et al. | |
| RE36,502 E | 1/2000 | Organek et al. | |
| 6,561,332 B2 | 5/2003 | Organek et al. | |
| 6,766,889 B1 * | 7/2004 | Pennycuff | 192/35 |
| 6,932,205 B2 * | 8/2005 | Kurita | 192/44 |

* cited by examiner

*Primary Examiner*—J. Allen Shriver
*Assistant Examiner*—John V Ligerakis
(74) *Attorney, Agent, or Firm*—David C. Purdue; John C. Purdue

(57) ABSTRACT

An actuator for selectively causing axial compression of friction elements in a clutch is disclosed. The actuator comprises a pair of beveled wedge washers and a bearing race supported between the washers. The race supports conical bearing rollers in a generally radial orientation. An actuator plate is mounted for rotation relative to the bearing race and includes bearing ramp surfaces that are operable to move the conical bearing rollers radially inwardly thereby forcing the washers to move apart axially and to thereby cause compression of and torque transfer through the friction elements. A clutch including the actuator is well suited for inclusion in a transfer case.

8 Claims, 13 Drawing Sheets

CONICAL CLUTCH PACK ACTUATOR ESPECIALLY FOR A TRANSFER CASE

FIELD OF THE INVENTION

This invention relates to a power transfer mechanism in which torque is selectively transmitted through a friction engagement device. More particularly, the present invention relates to a torque transfer device with a novel actuator for effecting axial compression of a friction engagement device so that torque will be transmitted therethrough. The invention is especially suited for use in a vehicular transfer case that receives torque from a prime mover and delivers that torque, as desired, to the front and rear drive axles of the vehicle.

BACKGROUND OF THE INVENTION

Automotive transfer cases are used in vehicles with four wheel drive to distribute torque to front and rear axles. Some transfer cases that do not provide full time four wheel drive are equipped with friction engagement devices that are selectively actuated to cause the transmission of torque to the axle(s) for the wheels that are not full time drive wheels. Typically, such friction engagement devices include disk packs that transmit torque when subjected to axial compression and do not transmit torque when uncompressed. As is stated in columns 1 and 2 of U.S. Pat. No. 6,561,332, "The use of a ball ramp actuator to operate a driveline master clutch is known in the art. U.S. Pat. Nos. 5,441,137; 5,469,948; 5,505,285; 5,651,437; 5,810,141; 5,910,061; 5,964,330; and RE 36,502 assigned to the same assignee as this application, all of which are hereby expressly incorporated by reference, disclose methods of using a ball ramp actuator to supply the clamping force on a clutch disc which can be used to frictionally rotationally connect the engine flywheel to the transmission input shaft. The ball ramp actuator is activated when a electrical current is supplied to a coil thereby producing an electromagnetic field in a coil pole which applies a retarding force to a rotating armature. The rotating armature is commonly nonrotatably connected to an annular control plate which has a plurality of control ramps which vary in depth. An opposed annular activation plate has a like number of opposed variable depth activation ramps where a corresponding number of rolling elements are trapped between the control and activation ramps. As the retarding force is applied to the control plate, the rotational movement of the control plate relative to the activation plate causes the rolling elements to traverse the control ramps and the activation ramps thereby causing an increase in separation distance between the control and activation plates to provide the clutch disc clamping force.

"Also shown in the prior art are other types of vehicle driveline devices which make use of a ball ramp mechanism to provide a clamping load to a clutch pack. U.S. Pat. No. 5,092,825 discloses a limited slip differential having a clutch pack loaded by a ball ramp actuator. U.S. Pat. No. 5,499,951 discloses a driveline transfer case where the torque split is controlled by a ball ramp actuator. U.S. Pat. No. 5,528,950 discloses a transmission inertia brake where a ball ramp actuator loads a clutch pack to slow a spinning transmission shaft. U.S. Pat. No. 5,819,883 discloses a driveline retarder in which a ball ramp actuator is used to load a clutch pack to rotate a hydraulic pump in response to a signal from a control unit. The disclosures of U.S. Pat. Nos. 5,092,825; 5,499,951; 5,528,950 and 5,819,883 are all hereby incorporated by reference."

Thus, compression of a clutch pack carried out with the use of co-acting ball ramps is known. Ball ramp actuators for clutch packs are functional but producing the parts that make up the ball ramps involves complex machining operations.

SUMMARY OF THE INVENTION

The present invention provides a novel actuator for causing selective axial compression of a friction engagement device so that torque is transmitted therethrough. The actuator comprises a pair of beveled wedge washers, a bearing race between the washers supporting conical bearing rollers in a generally radial orientation and an actuator plate that is rotated, relative to the bearing race, to move the conical bearing rollers radially inwardly to force the washers to move apart axially and to thereby cause compression of and torque transfer through a friction engagement device such as a disk pack.

The invention also resides in a transfer case having a friction engagement device comprising a disk pack clutch and including the friction engagement device actuator of the present invention.

It is an object of the present invention to provide a novel actuator for a disk pack of a clutch.

It is a further object of the invention to provide an improved transfer case including an actuator of the present invention.

It is yet another object of the invention to provide an actuator that is long lasting, requires no maintenance and is fairly easy to construct.

These and other objects and advantages of the present invention will become apparent from a consideration of the following specification considered together with the attached drawing Figures.

BRIEF DESCRIPTION OF THE DRAWING FIGURES

DETAILED DESCRIPTION OF THE PREFERRED EMBODIMENT

Figure 1:
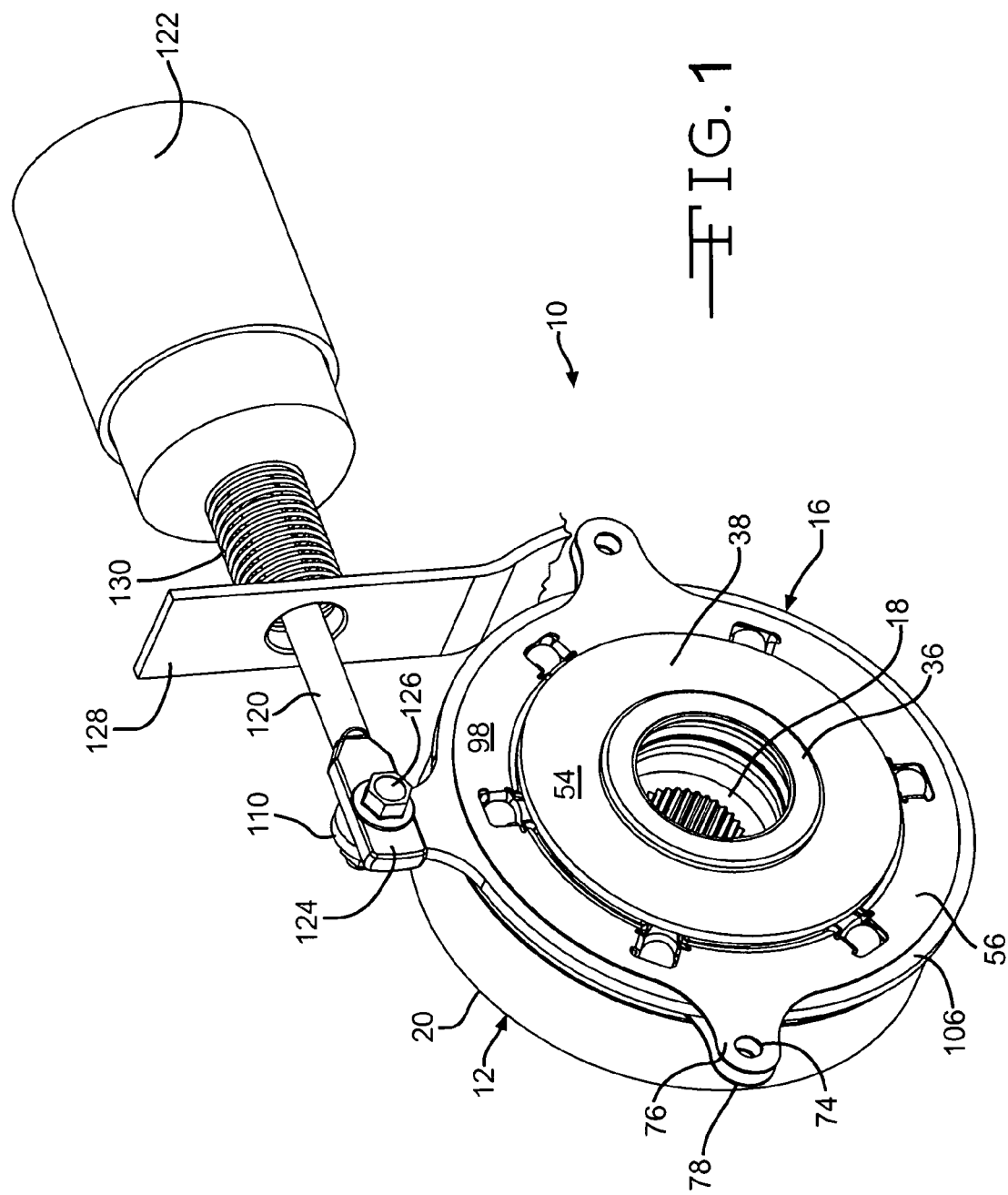
FIG. 1 is a perspective view of a friction engagement device including a conical roller clutch actuator according to the present invention.

Referring now to the several drawing Figures in which like reference numerals have been used throughout to refer to like parts, an assembly, including a new actuator according to the present invention for actuating a friction engagement device, is indicated generally at 10. The assembly 10 comprises a friction engagement device 12 including a disk pack 14 and an actuator 16. The actuator 16 is illustrated in the drawing Figures in combination with the friction engagement device 12. The actuator 16 and the friction engagement device 12 are especially suitable for use in a transfer case in which torque is applied through a shaft either to a clutch hub 18 or to a clutch housing 20 and is selectively transferred to the other one of the clutch hub or clutch housing 18 or 20 by friction elements indicated at 22, some of which are connected to and supported on the clutch hub 18 and others of which are connected to and supported on the clutch housing 20. Torque is transmitted from the clutch hub 18 to the clutch housing or vice versa when the friction elements 22 are axially compressed into frictional engagement with each other. When the friction elements 22 are not axially compressed, torque is not transmitted. Partial torque transmission is also possible with controlled partial axial compression. A circumferentially extending clutch pressure plate 24 is positioned next to the friction elements 22 on one side and, in the embodiment shown in the drawing Figures, a radially oriented shoulder 26 formed on the clutch housing 20 is positioned on the other side of the friction elements 22. Axial movement of the pressure plate 24 is effected in a known manner by axial displacement of first ends 28 of a plurality of clutch actuation levers 30. Second, outer ends 32 of the levers 30 are axially fixed, in this case, in an inwardly opening, circumferentially extending groove indicated at 34 formed in the clutch housing 20. Thus, when the first ends 28 of the clutch actuation levers 30 are axially displaced from the position shown in FIG. 10 to the position shown in FIG. 11, the levers 30 displace the clutch pressure plate 24 to the left in FIGS. 10 and 11 so that the disk pack 14 is axially compressed between the shoulder 26 and the clutch pressure plate 24 so that torque is transmitted through the disk pack 14 from the clutch hub 18 to the clutch housing 20 or vice versa.

The present invention is concerned with an actuator device 16 for causing axial compression of the disk pack 14 of the friction engagement device 12, such as one that might be incorporated in a transfer case. The actuator 16 can be supported on a shaft (not shown) or on a portion of the clutch hub 18 so that it is coaxially supported relative to the clutch hub 18 and the clutch housing 20 between a thrust bearing 36 and the clutch actuation levers 30. The thrust bearing 36 would be locked against axial movement to the right in FIGS. 10 and 11, for example, by abutting a portion of the housing in which the assembly 10 is supported or, possibly a shoulder on the shaft. The actuator 16 is held captive between the thrust bearing 36 and the levers 30.

Figure 5:
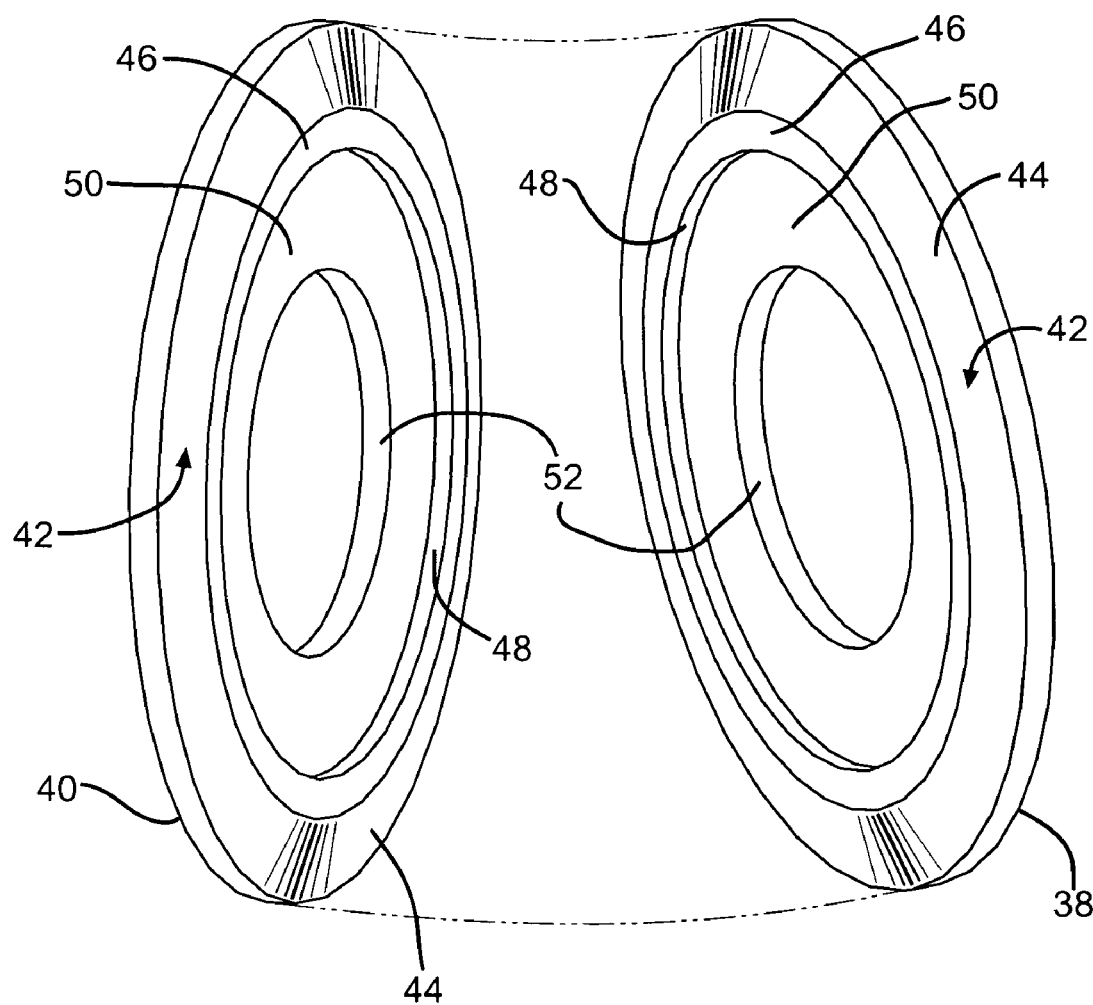
FIG. 5 is a perspective view of first and second wedge plates that serve to axially compress the friction engagement device.

The actuator 16 comprises a first beveled wedge washer 38 and a second beveled wedge washer 40 which are shown, in some detail in FIG. 5. The washers 38 and 40 are identical to each other and each one includes an outer beveled region 42 that extends circumferentially around the washers 38 and 40 and that defines a beveled bearing roller surface 44. Radially inwardly from the beveled bearing roller surface 44, there is a ring shaped flat face 46 that extends radially inwardly from the beveled bearing roller surface 44 to an axially extending shoulder 48. A recessed inner face 50 extends radially inwardly from the shoulder 48 to a bore defined by a second axially extending shoulder 52. The bore is for mounting the washers 38 and 40 on a shaft (not shown) or on an extension of the clutch hub 18 or on any other suitable mounting in which the washers 38 and 40 are coaxially mounted with the disk pack 14. The sides of the washers 38 and 40 that are opposite the sides with the beveled bearing roller surfaces 44 have substantially flat surfaces or faces 54 shown, for example, in FIGS. 6 and 10. As described in some detail below, the beveled bearing roller surfaces 44 are selectively acted upon by conical bearing rollers carried in a bearing race with the result that one of the washers is axially displaced from the other whereby the disk pack 14 of the friction engagement device 12 is axially compressed so that torque is transmitted therethrough. Under all conditions, the clutch actuation levers 30 will bias the washer 40 towards the right in FIGS. 10 and 11, for example. Only when this biasing force is overcome by the washer 40, will the levers 30 will be displaced and cause the pressure plate 24 to compress the disk pack 16.

Figure 2:
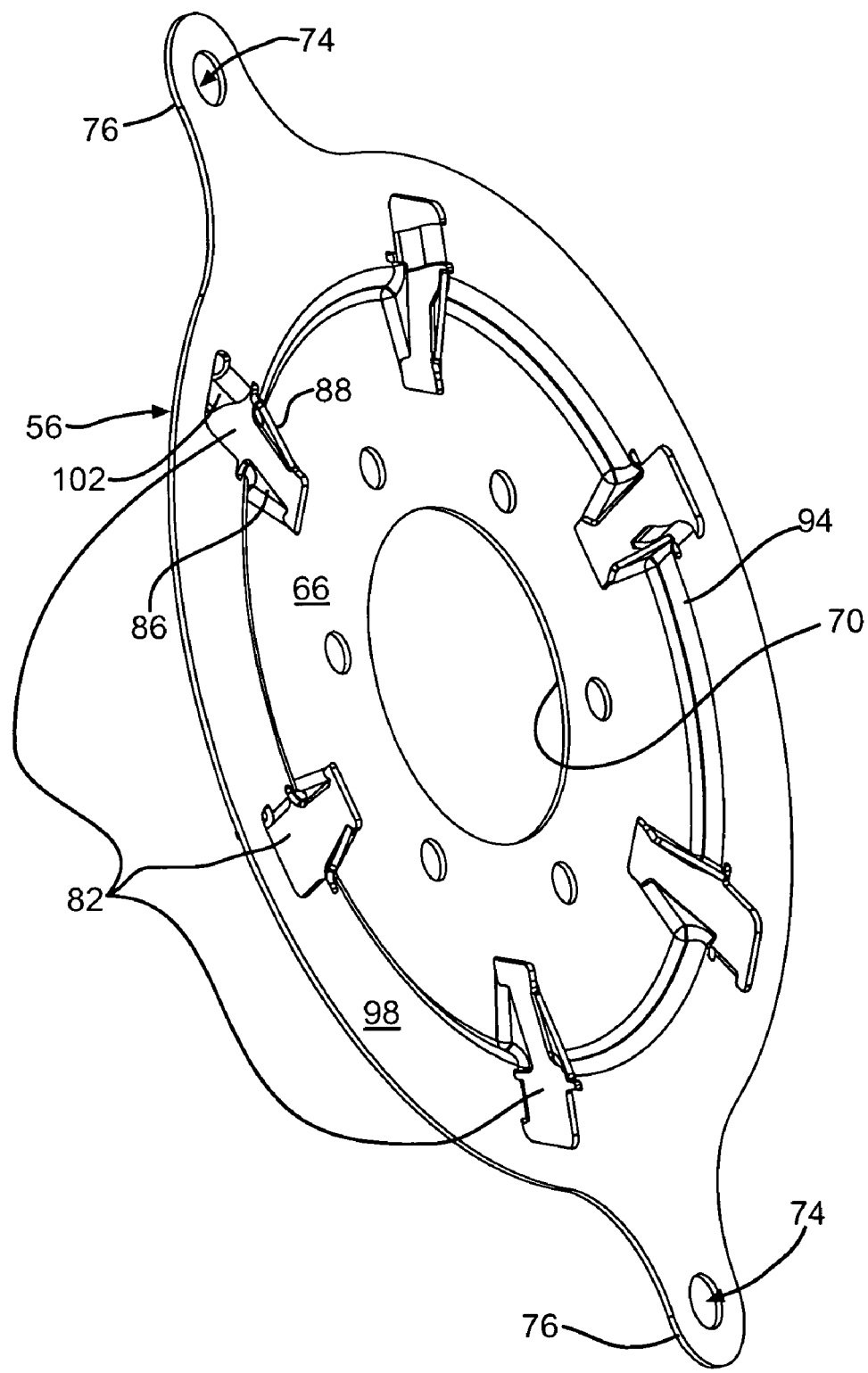
FIG. 2 is a perspective view of a first bearing roller and bearing ball containment plate that is part of the actuator.
Figure 3:
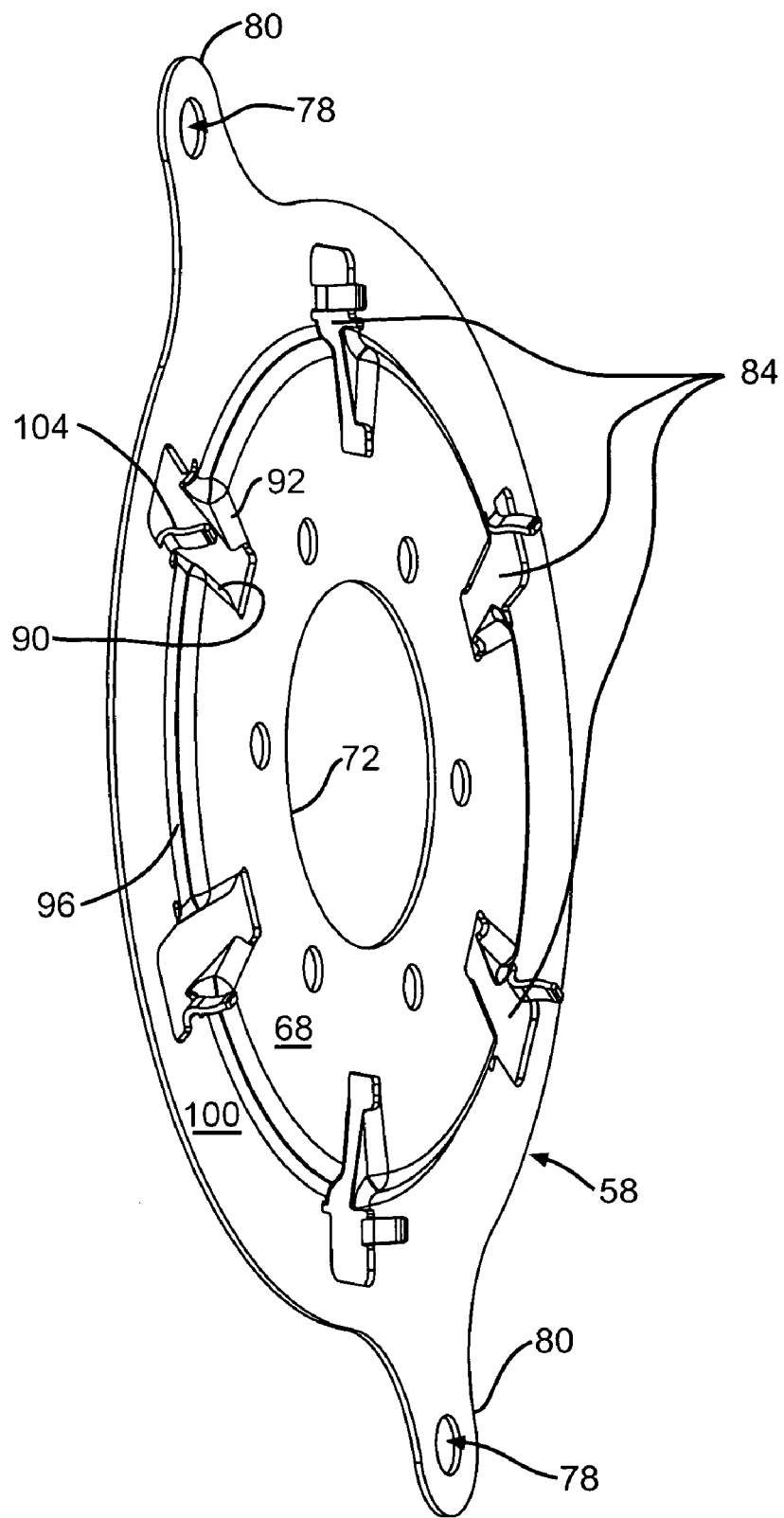
FIG. 3 is a perspective view of a second bearing roller and bearing ball containment plate that is part of the actuator.
Figure 8:
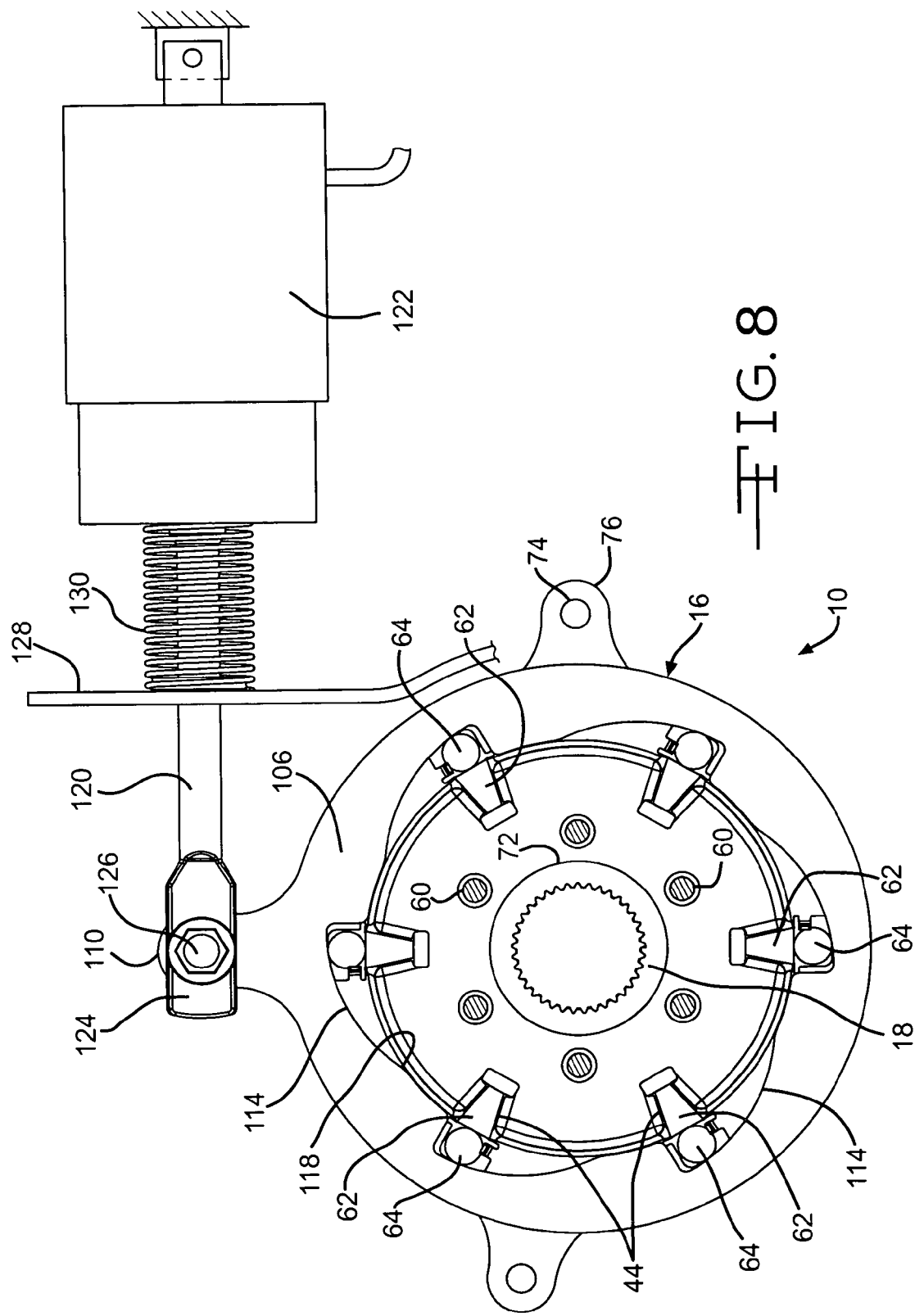
FIG. 8 is a front view of the friction engagement device actuator as shown in FIG. 6 with a containment plate and a wedge plate removed for illustrative purposes.
Figure 10:
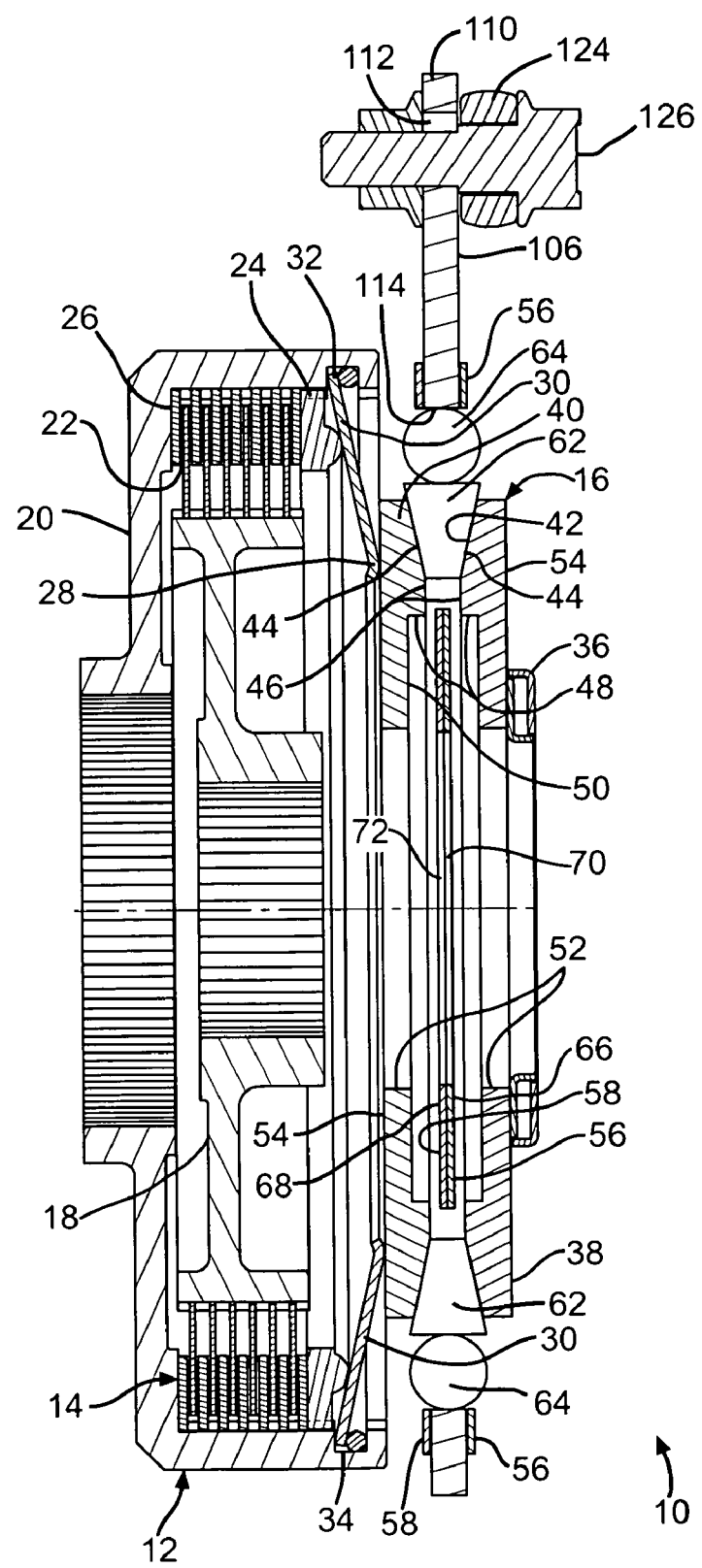
FIG. 10 is a view, partially in cross-section, taken along the lines 10-10 in FIG. 6.
Figure 11:
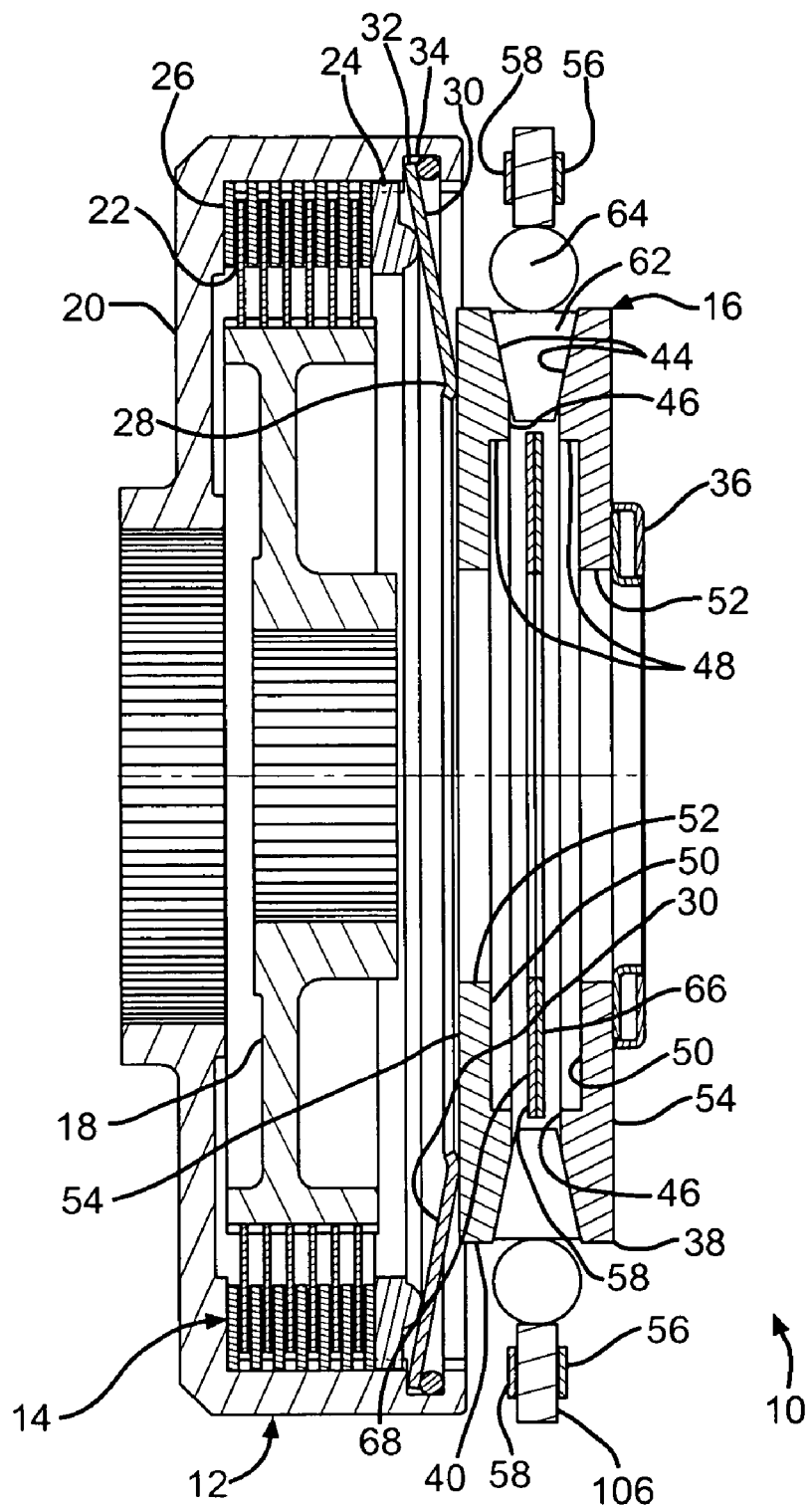
FIG. 11 is a view, partially in cross section, taken along the lines 11-11 in FIG. 7.
Figure 12:
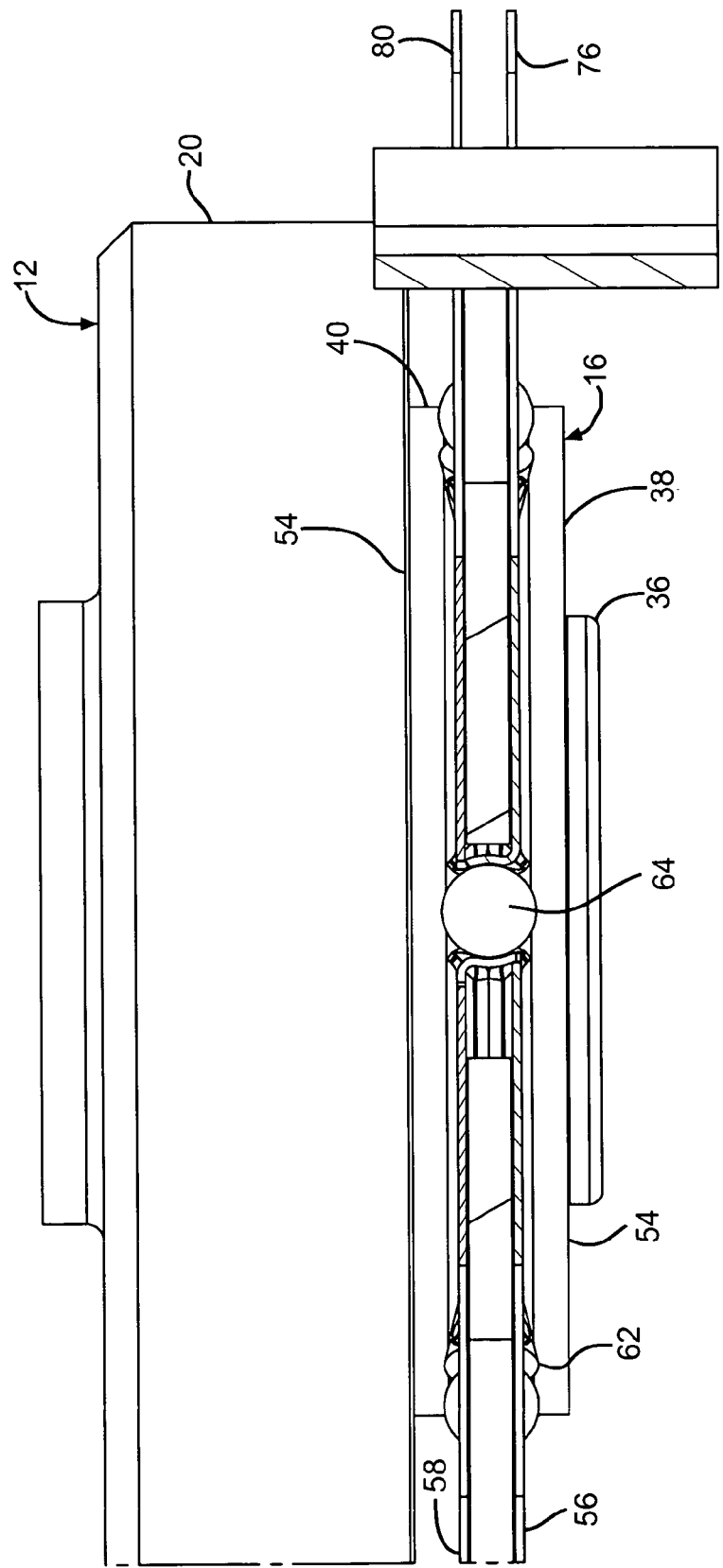
FIG. 12 is a view, partially in cross-section, taken along the lines 12-12 in FIG. 6.
Figure 13:
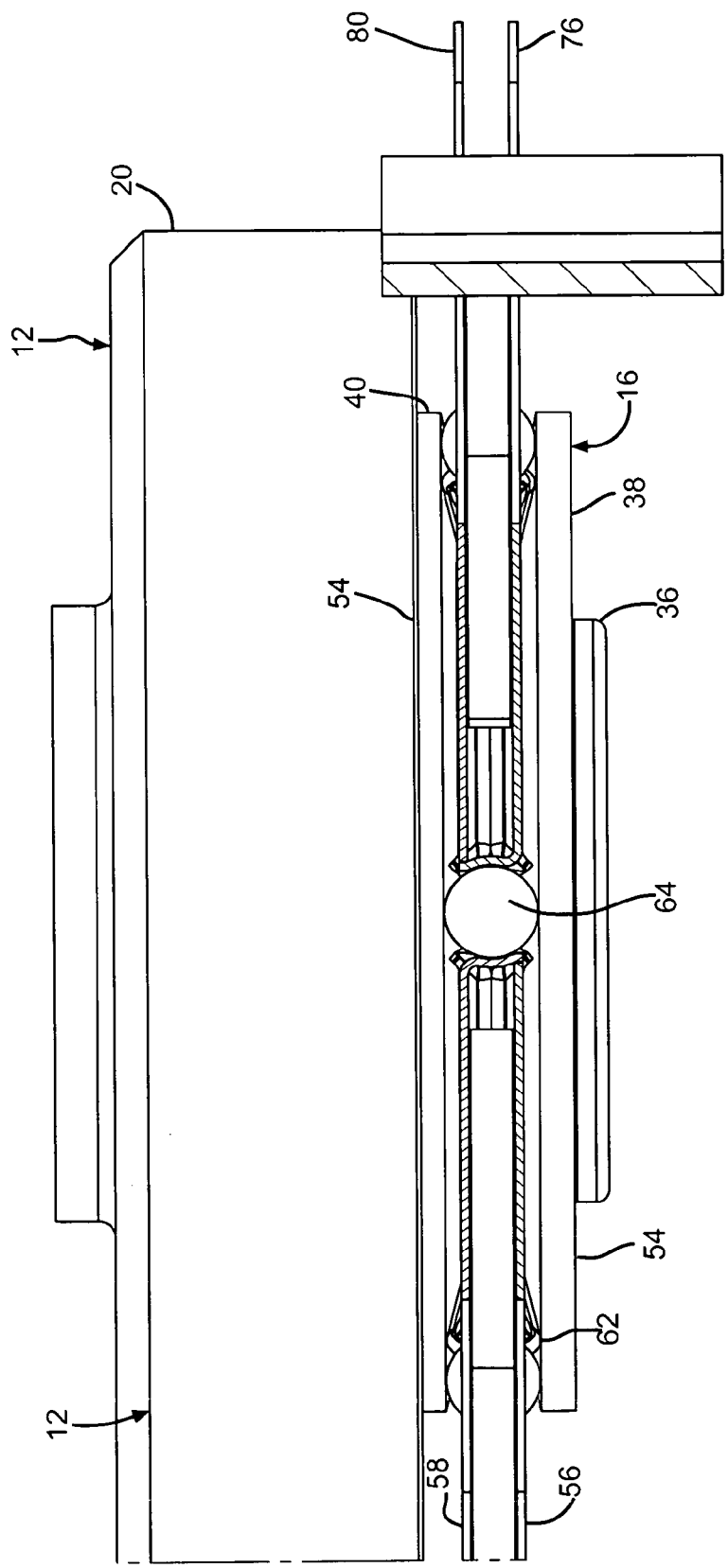
FIG. 13 is a view, partially in cross-section, taken along the line 13-13 in FIG. 7.

Referring now to FIGS. 2 and 3, a first bearing ball and conical bearing roller containment plate 56 (FIG. 2) and a second bearing ball and conical bearing roller containment plate 58 (FIG. 3) are illustrated. These plates can be identical although, in the case of plates 56 and 58, there are small differences between them. In any case, the plates 56 and 58 and the actuator 16 of the invention function in the manner described below. The plates are adapted to be secured together, as by rivets 60 (FIG. 8) to form a unitary bearing race for supporting conical bearing rollers or tapered bearing rollers 62 and bearing balls 64 (FIGS. 8, 10 and 11). The rivets 60 connect a central recessed portion 66 of plate 56 to a central recessed portion 68 of plate 58 in face-to-face contact. A central clearance opening is provided in the plate 56 and it is defined by a wall 70. A central clearance opening is provided in the plate 58 and it is defined by a wall 72. Openings indicated at 74 in support ears 76 provided on the plate 56 and openings indicated at 78 in support ears 80 provided on the plate 58 are used to fix and support the bearing race and to lock it against rotation. For example, a pair of round pins (not shown) can be provided inside of the housing for the friction engagement device 12 and those pins can extend through the openings 74 and 78 to support the bearing race and to prevent it from rotating. The bearing race formed by the plates 56 and 58 is adapted to be supported by the ears 76 and 80 so that it is positioned coaxially with the washers 38 and 40

A plurality of bearing ball and bearing roller windows, indicated generally at 82 (FIG. 2) are provided in the plate 56 and the windows 82 are arranged generally in a circular pattern. When the plate 56 is connected to the plate 58, the windows 82 align with bearing ball and bearing roller windows, indicated generally at 84, provided in the plate 58. The inner portions of the windows 82 and 84 are formed in the central recessed portions 66 and 68 of the plates 56 and 58. The inner portions of the windows 82 are flanked by conical bearing roller support ears 86 and 88. The inner portions of the windows 84 are flanked by conical bearing roller support ears 90 and 92. The conical bearing roller support ears 86, 88, 90 and 92 cooperate to support conical bearing rollers 62 so that their axes extend generally in a radial orientation relative to the axis of the wedge washers 38 and 40. The bearing rollers 62 are supported for limited movement towards and away from the axis of the bearing race formed by the plates 56 and 58.

The plate 56 has a circumferential shoulder 94 that aligns, when the plates 56 and 58 are connected, with a shoulder 96 provided on the plate 58. An outer ring 98 extends outwardly from the shoulder 94 on the plate 56 and an outer ring 100 extends outwardly from the shoulder 96 provided on the plate 58. The outer portions of the windows 82 in the plate 56 are formed in the outer ring 98 of the plate 56 but the windows 82 stop short of the outer edge of the plate 56. Similarly, the outer portions of the windows 84 in the plate 58 are formed in the outer ring 100 of the plate 58 but the windows 84 stop short of the outer edge of the plate 58. The outer portions of the windows 82 are flanked on one side by a bearing ball support ear 102 formed in the plate 56. The outer portions of the windows 84 are flanked on one side by a bearing ball support ear 104 formed in the plate 58. The ears 102 and 104 cooperate, when the plates 56 and 58 are connected together, to support bearing balls 64 and to permit movement of the bearing balls 64 in a radial direction in towards or away from the longitudinal axis of the bearing race formed by the plates 56 and 58.

Figure 4:
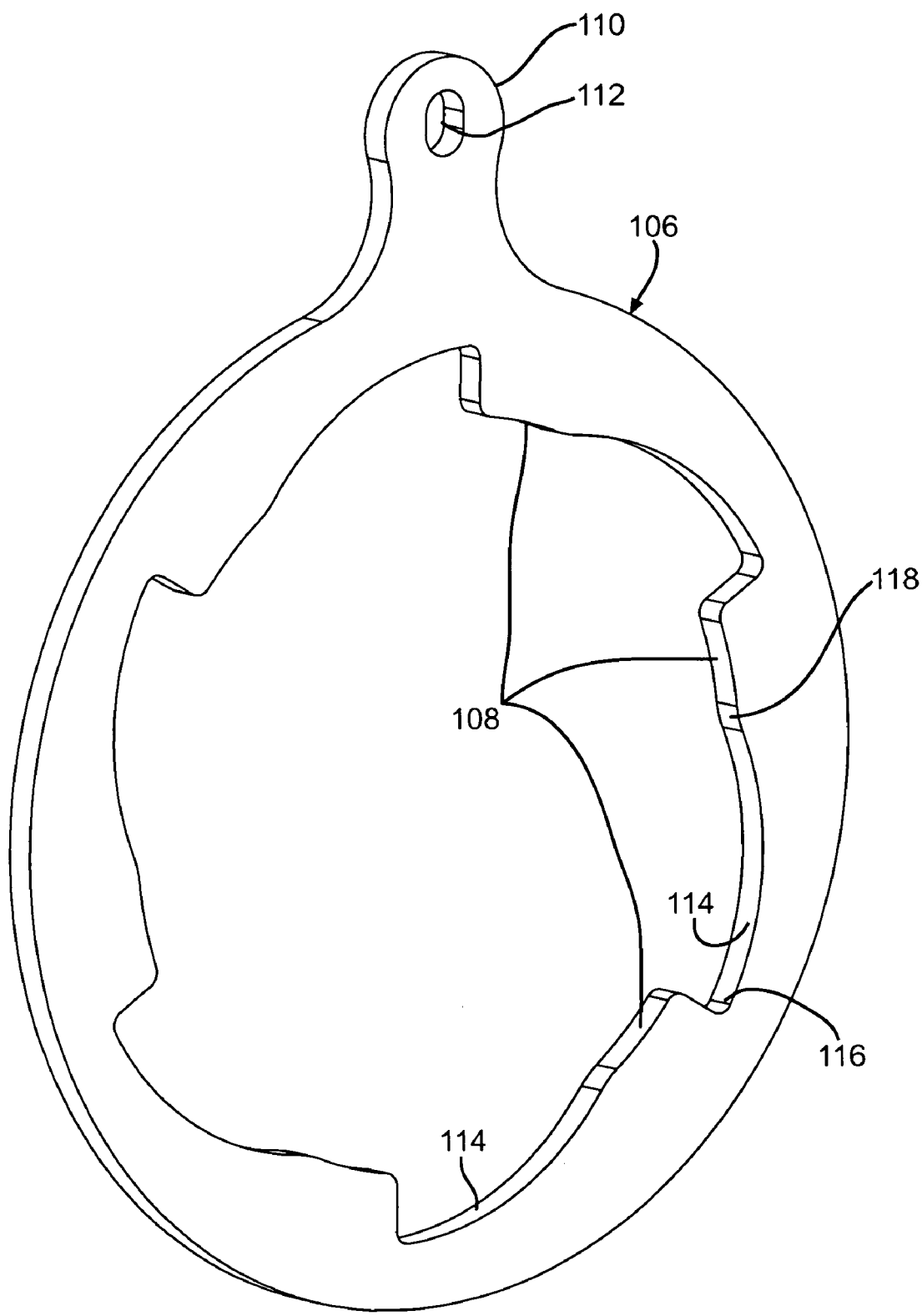
FIG. 4 is a perspective view of an actuator plate that includes ramps that act on bearing balls carried in a bearing race that is made up of the containment plates.

When the plates 56 and 58 are fastened together to make a bearing race, the outer rings 98 and 100 are spaced apart to define a channel with a bottom defined by the shoulders 94 and 96. An actuator plate 106 (FIG. 4) is configured to be carried in the channel between the rings 98 and 100 and to rotate a small amount relative to the bearing races defined by the containment plates 56 and 58. The plate 106 has a plurality of support surfaces 108 that support the plate 106 for rotation on the shoulders 94 and 96 on the containment plates 56 and 58. An ear 110 is formed on the actuator plate and has an opening 112 (FIG. 10).

Between the support surfaces 108 (FIG. 4), there are bearing ball ramps 114 that have a generally circumferential orientation from a high or upper end 116 that is a given distance from the axis of the plate 106 to a low or bottom end 118 that is less than the given distance from the axis of the plate 106. The bearing ball ramps 114 are configured to act on the bearing balls 64 and to selectively force them to move radially inwardly towards the axis of the actuator 16 when there is relative rotational movement as between the bearing race formed of the containment plates 56 and 58, on the one hand, and the plate actuator 106, on the other hand. As mentioned previously, the ears 76 and 80 of the containment plates 56 and 58 are to be fixed relative to the housing or some other fixed part to support and to prevent rotation of the bearing race formed by the plates 56 and 58. The actuator plate 106 is mounted on the shoulders 94 and 96 of the plates 56 and 58 and the ear 110 of the plate 106 is connected to a linear actuator comprising, for example, a rod 120 that can be extended from and retracted into a cylinder 122. There is a flat 124 formed on the end of the rod 120 where the rod 120 is pivotally connected by a fastener 126 to the ear 110 through the opening 112 (FIG. 10). Extension and retraction of the linear actuator is translated into rotational movement of the plate 106 about the bearing race formed by the plates 56 and 58 on which the plate 106 is rotationally supported.

Several features and characteristics of the invention will now be described with reference to FIGS. 6, 8, 10 and 12, in which the actuator 16 is shown in an initial, non-actuating position or condition and with reference to FIGS. 7, 9, 11 and 13 in which the actuator 16 is shown in an actuating position or condition in which it is operable to axially compress the disk pack 14 for torque transmission therethrough. In the initial position, the actuator plate 106 is positioned so that the upper end 116 of each of the bearing ball ramps 114 is over a corresponding one of the bearing balls 64. As mentioned above, the clutch actuation levers 30 bias the washer 40 to the right and the washer 38 is prevented from moving axially to the right by the thrust bearing 36. Therefore, the washers 38 and 40 are going to be subject to a biasing force that biases them axially towards each other. This biasing force is translated through the beveled surfaces 44 of the washers 38 and 40 to the conical bearing rollers 62 that are supported by the containment plates 56 and 58, and biases the conical bearing rollers 62 to move radially outwardly. The extent of this movement is limited or restricted by the actuator plate 106 and co-action between the ramps 114 and the bearing balls 64 and between the bearing balls 64 and the conical bearing rollers 62. In other words, the biasing force that biases the washers 38 and 40 towards each other also biases the conical bearing rollers 62 and the bearing balls 64 radially outwardly against the ramps 114 on the actuator plate 106. If the parts of the actuator 16 wear down, it may be the case that the washers are not biased enough towards each other to cause the bearing balls 64 to be pressed against the upper ends 116 of the ramps 114. In other words, there may be a little play in the system, although this is not likely to lead to any particular problem except, perhaps, some rattling in the system. To address this situation, it may be desirable to bias the actuator plate 106 towards the actuating position. This can be effected with a biasing element acting against a stationary portion 128 of a housing for the assembly 10. The biasing element may take the form of a spring 130 that biases the linear actuator and the rod 120 and the actuator plate 106 towards the actuating position.

When the system including the actuator 16 does not have play, rotation of the clutch housing 20 and the elements in it will cause rotation of the beveled washer 40 in a given direction. This rotation will cause the conical bearing rollers 62 to rotate and that will cause the beveled washer 38 to rotate in a direction that is opposite the direction in which the washer 40 is rotating. The portion of the thrust bearing 36 that is in contact with the washer 38 can rotate therewith and the opposite side of the thrust washer can remain stationary against a portion of a housing for the assembly 10.

Figure 6:
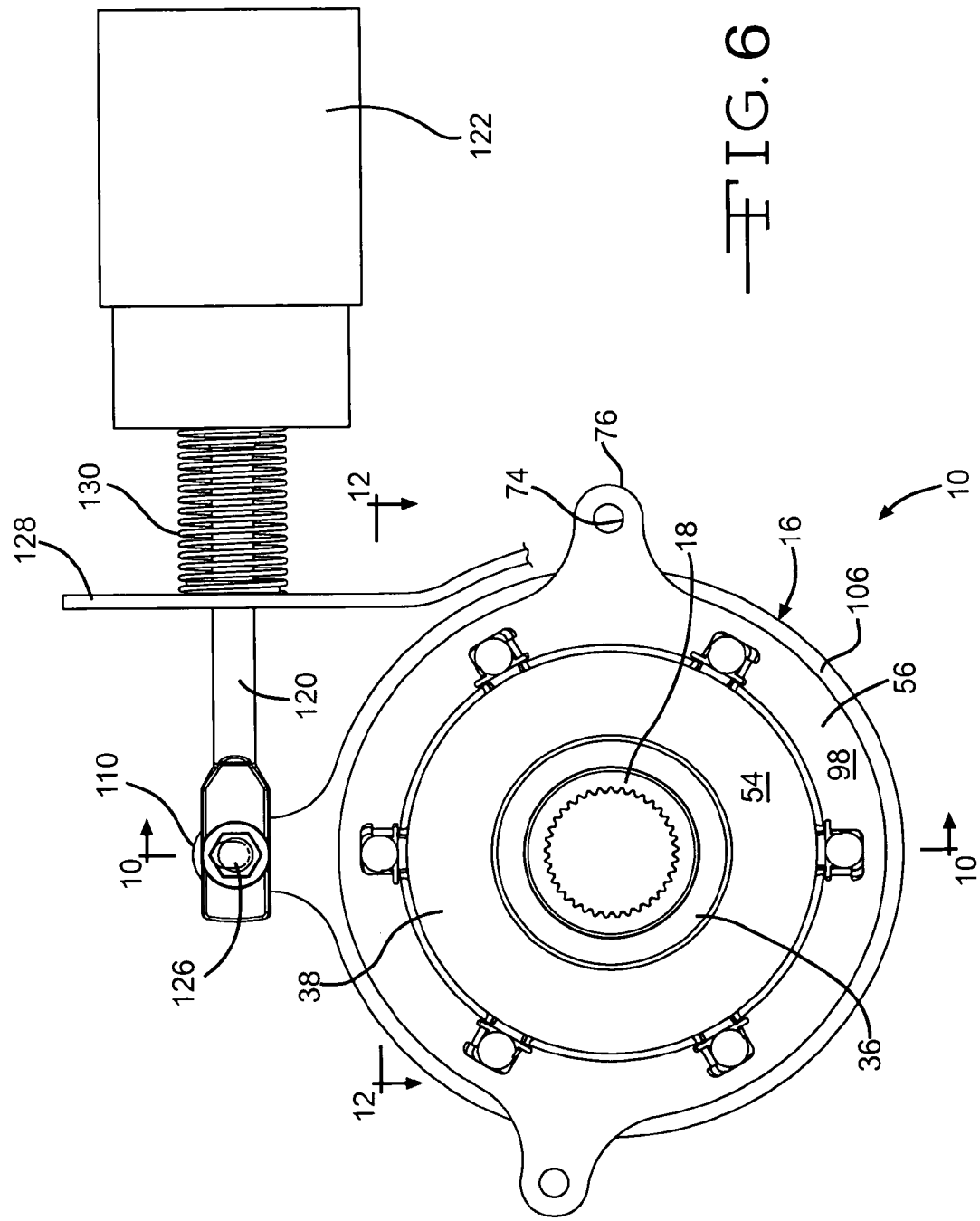
FIG. 6 is a front view of the friction engagement device actuator shown in FIG. 1 with the actuator in a first, neutral position.
Figure 7:
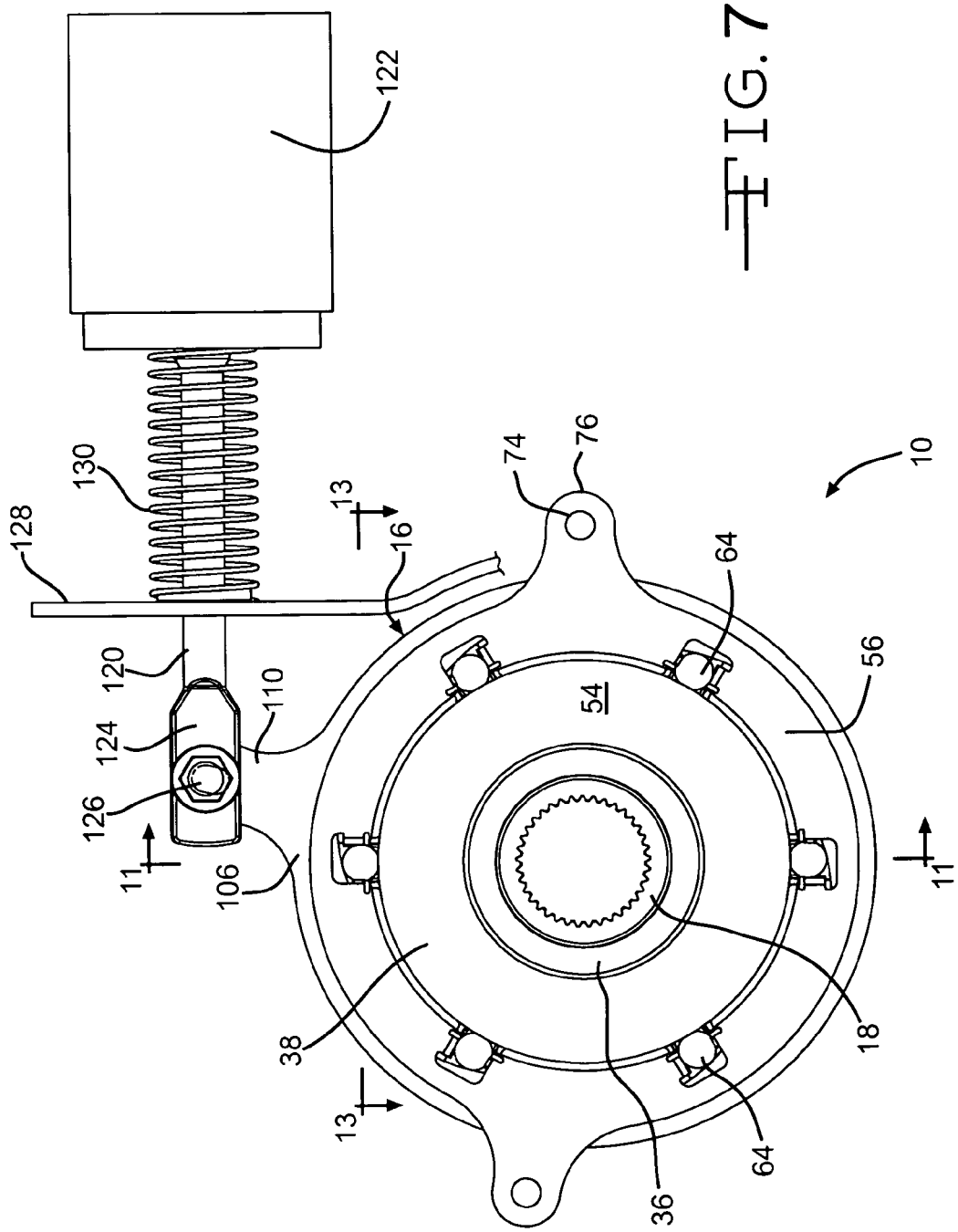
FIG. 7 is a front view of the friction engagement device actuator shown in FIGS. 1 and 6 with the actuator in a second, engaged position.
Figure 9:
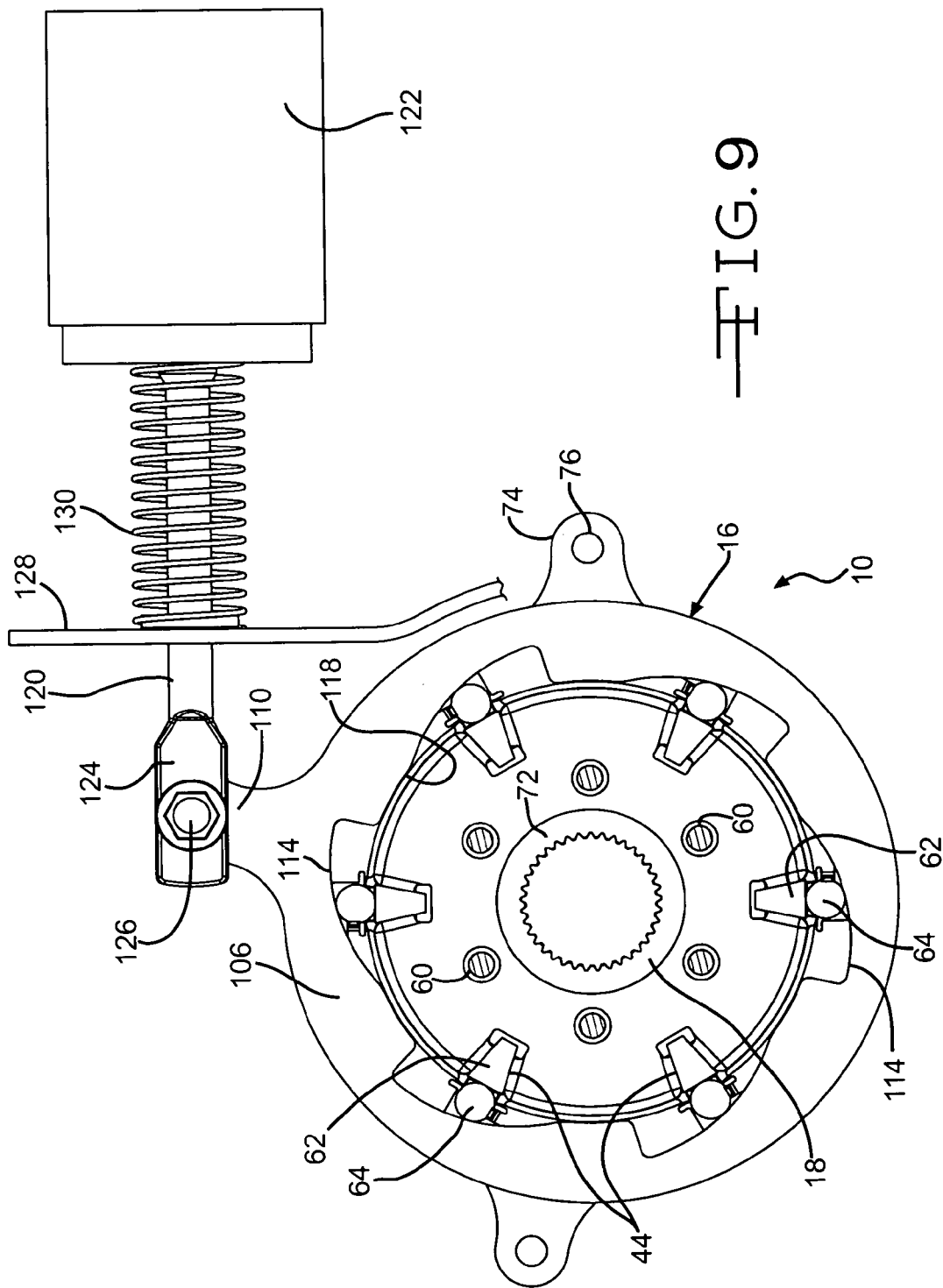
FIG. 9 is a front view of the friction engagement device actuator as shown in FIG. 7 with a containment plate and a wedge plate removed for illustrative purposes.

Considering now FIGS. 6 through 9, the action of the linear actuator including the rod 120 can be seen. In FIGS. 6 and 8, the rod 120 is extended to a position where the bearing balls 64 are at the outermost radial position in the bottoms 116 of the ramps 114 and the conical bearing rollers 62 are at their outermost radial position where they will exert little or no force on the washers 38 and 40 tending to move them apart. In FIGS. 7 and 9, the rod 120 has been retracted causing relative rotation between the actuator plate 106 and the bearing race formed by the containment plates 56 and 58. This has caused different parts of the ramps 114 to be positioned over each of the bearing balls 64 and those portions of the ramps 114 are closer to the axis of the actuator 16. As a consequence of co-action between the ramps 114 and the bearing balls 64, the bearing balls 64 have been forced radially inwardly from the FIGS. 6 and 8 positions, the bearing balls 64 have forced the conical bearing rollers 62 radially inwardly and the tapered sides of the conical bearing rollers 62 acting on the beveled bearing roller surfaces 44 of the washers 38 and 40 has caused them to move apart as can be seen by considering and comparing FIGS. 10 and 12 (together) with FIGS. 11 and 13 (apart). Since axial movement of the washer 38 away from the disk pack 14 is prevented by the thrust bearing 36, axial movement is restricted to the washer 40 which moves towards the disk pack 14 causing axial compression thereof by acting through the clutch actuation levers 30.

It will be appreciated that there are infinite intermediate positions for the rod 120 between the extended position shown in FIGS. 6 and 8 and the retracted position shown in FIGS. 7 and 9 and these intermediate positions will be associated with more or less axial compressive forces exerted by the washer 40 on the disk pack 14, with more or less torque being transmitted through the disk pack 14. Thus, the present actuator 16 can control not only whether or not torque is transmitted through a friction engagement device but also how much torque is transmitted therethrough.

While the foregoing description sets forth very specific details about the construction and components of an actuator according to the present invention, it is presented only to enable one having ordinary skill in the art to practice the invention and is not to be construed as limiting the true scope of the present invention.

We claim:

1. An actuator for a clutch having friction elements supported for rotation about an axis, said actuator comprising
   a bearing race supported coaxially with the friction elements of the clutch, said bearing race supporting conical bearing rollers with axes oriented generally radially with respect to the clutch axis,
   first and second washers supported coaxially with said bearing race, said washers having beveled bearing surfaces positioned on opposite sides of said bearing rollers,
   an actuator plate mounted coaxially with said washers for limited rotation relative to said bearing race, said plate having bearing ramp surfaces that are operable, in a first rotational position of said plate, to maintain said bearing rollers a given distance from the axis of said washers and operable, in a second rotational position of said plate to maintain said bearing rollers a distance that is less than the given distance from the axis of said washers and wherein relative rotation between said actuator and said bearing race in a first direction causes axial compression of the clutch and wherein relative rotation between said actuator and said bearing race in a direction opposite the first direction relaxes axial compression of the friction elements of the clutch.

2. The actuator claimed in claim 1 which further comprises bearing balls positioned between said bearing rollers and said actuator bearing ramp surfaces.

3. The actuator claimed in claim 1 wherein said actuator plate is mounted on a shoulder provided on the bearing race for rotational movement relative to said bearing race.

4. The actuator claimed in claim 1 which further comprises a linear actuator operably connected to move said actuator plate from said first rotational position to said second rotational position.

5. A transfer case comprising a clutch having friction elements supported for rotation about an axis, and an actuator for said clutch, said actuator comprising
   a bearing race supported coaxially with the friction elements of the clutch, said bearing race supporting conical bearing rollers with axes oriented generally radially with respect to the clutch axis,
   first and second washers supported coaxially with said bearing race, said washers having beveled bearing surfaces positioned on opposite sides of said bearing rollers,
   an actuator plate mounted coaxially with said washers for limited rotation relative to said bearing race, said plate having bearing ramp surfaces that are operable, in a first rotational position of said plate, to maintain said bearing rollers a given distance from the axis of said washers and operable, in a second rotational position of said plate to maintain said bearing rollers a distance that is less than the given distance from the axis of said washers and wherein relative rotation between said actuator and said bearing race in a first direction causes axial compression of the clutch and wherein relative rotation between said actuator and said bearing race in a direction opposite the first direction relaxes axial compression of said friction elements of said clutch.

6. The transfer case claimed in claim 5 wherein said actuator further comprises bearing balls positioned between said bearing rollers and said actuator bearing ramp surfaces.

7. The transfer case claimed in claim 5 wherein said actuator plate is mounted on a shoulder provided on the bearing race for rotational movement relative to said bearing race.

8. The transfer case claimed in claim 5 wherein said actuator further comprises a linear actuator operably connected to move said actuator plate from said first rotational position to said second rotational position.

* * * * *